(12) United States Patent
Lu et al.

(10) Patent No.: US 8,480,170 B2
(45) Date of Patent: Jul. 9, 2013

(54) APPARATUS FOR POSITIONING A SADDLE OF AN EXERCISE BIKE

(75) Inventors: Tai-Yang Lu, Taichung (TW); Ying-Pin Chiang, Taichung (TW)

(73) Assignee: Jet Sport Industrial Co., Ltd., Taichung (TW)

( * ) Notice: Subject to any disclaimer, the term of this patent is extended or adjusted under 35 U.S.C. 154(b) by 149 days.

(21) Appl. No.: 13/187,246

(22) Filed: Jul. 20, 2011

(65) Prior Publication Data
US 2012/0161480 A1    Jun. 28, 2012

(30) Foreign Application Priority Data
Dec. 24, 2010    (TW) .............................. 99225013 U

(51) Int. Cl.
| B62J 1/00 | (2006.01) |
| B62J 1/02 | (2006.01) |
| B62J 1/08 | (2006.01) |
| A63B 22/06 | (2006.01) |
| A63B 22/08 | (2006.01) |
| A63B 69/16 | (2006.01) |

(52) U.S. Cl.
USPC .............. 297/215.13; 297/195.1; 297/215.14; 482/57

(58) Field of Classification Search
USPC ............... 297/195.1, 195.11, 215.13, 215.14, 297/423.1, 461; 482/57
See application file for complete search history.

(56) References Cited

U.S. PATENT DOCUMENTS

| 5,441,327 | A | * | 8/1995 | Sanderson | ................ | 297/195.1 |
| 6,913,560 | B2 | * | 7/2005 | Ryan et al. | ........... | 297/215.13 X |
| 7,775,588 | B2 | * | 8/2010 | Segato | ..................... | 297/215.14 |
| 8,021,278 | B2 | * | 9/2011 | Huyck et al. | ......... | 297/215.13 X |
| 8,272,999 | B2 | * | 9/2012 | Huyck et al. | ......... | 297/215.13 X |
| 2006/0166792 | A1 | * | 7/2006 | Kuo | ................ | 482/57 |

* cited by examiner

*Primary Examiner* — Rodney B White

(57) ABSTRACT

A saddle-positioning apparatus includes a first positioning unit for positioning a saddle in a first dimension, a second positioning unit for positioning the saddle in a second dimension, and a lever connected to both of the first and second positioning units. The lever is movable from a neutral position in a direction to move the first positioning unit from a locking position to a releasing position to allow movement of the saddle in the first dimension. The lever is movable from the neutral position in an opposite direction to move the second positioning unit from a locking position to a releasing position to allow movement of the saddle in the second dimension.

20 Claims, 9 Drawing Sheets

APPARATUS FOR POSITIONING A SADDLE OF AN EXERCISE BIKE

BACKGROUND OF INVENTION

1. Field of Invention

The present invention relates to a bicycle or an exercise bike and, more particularly, to an apparatus for positioning a saddle of a bicycle or an exercise bike in two dimensions.

2. Related Prior Art

An exercise bike is a popular exercise machine. An exercise bike includes a seat tube, a seat post movably inserted in the seat tube, and a saddle connected to the seat post. Thus, the position of the saddle relative to the seat tube is adjustable based on the length of a user's legs. To hold the seat post in position, a quick-release apparatus is provided on the seat tube. The quick-release apparatus is operable to squeeze the seat tube to pinch the seat post. The adjustment of the position of the saddle relative to the seat tube is substantially vertical since both of the seat tube and the seat post extend substantially vertically. The position of the saddle relative to the seat tube cannot be adjusted based on the length of the user's torso or arms.

The present invention is therefore intended to obviate or at least alleviate the problems encountered in prior art.

SUMMARY OF INVENTION

It is the primary objective of the present invention to provide an apparatus for positioning a saddle in two dimensions.

To achieve the foregoing objective, the saddle-positioning apparatus includes a first positioning unit for positioning a saddle in a first dimension, a second positioning unit for positioning the saddle in a second dimension, and a lever connected to both of the first and second positioning units. The lever is movable from a neutral position in a direction to move the first positioning unit from a locking position to a releasing position to allow movement of the saddle in the first dimension. The lever is movable from the neutral position in an opposite direction to move the second positioning unit from a locking position to a releasing position to allow movement of the saddle in the second dimension.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
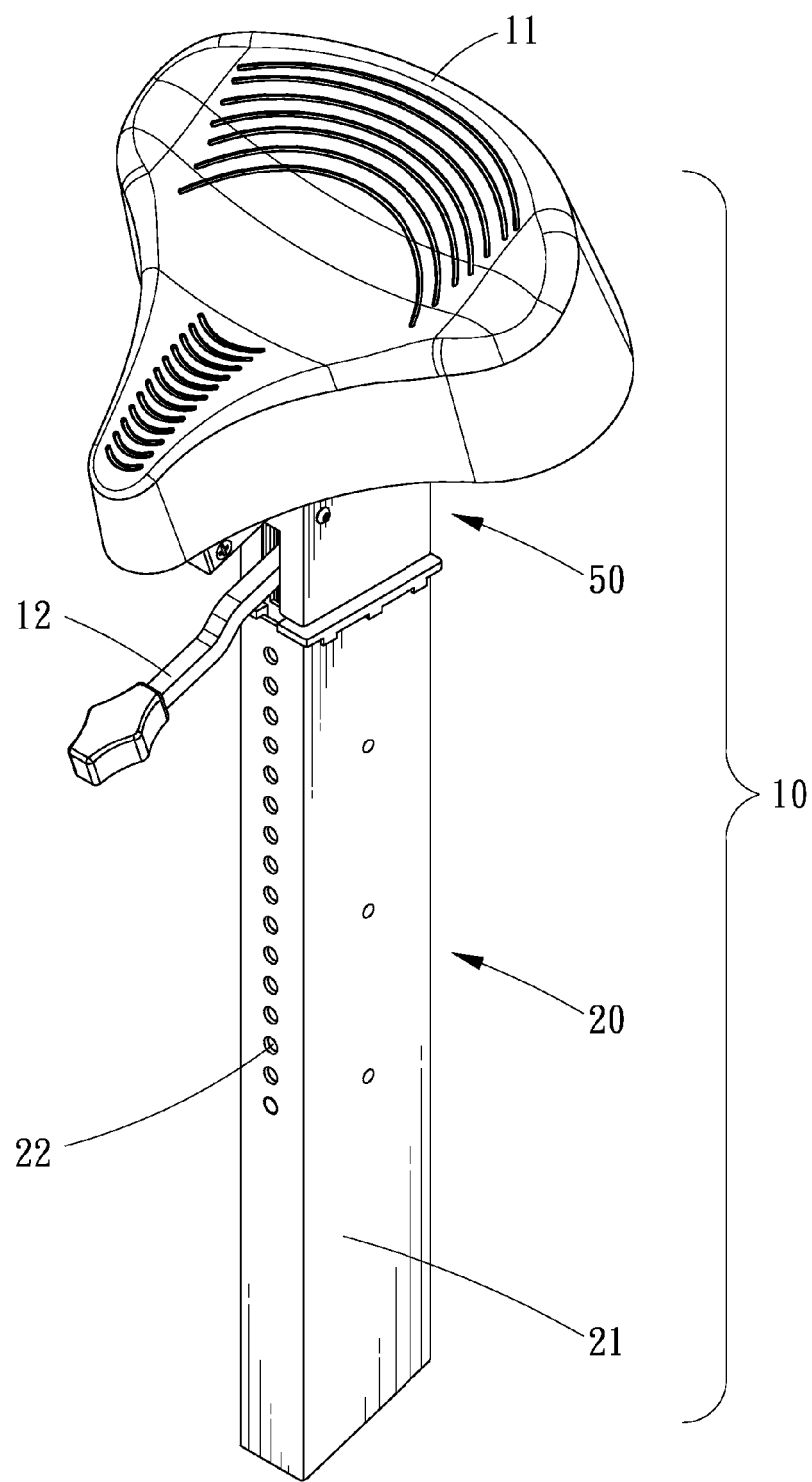
FIG. 1 is a perspective view of an apparatus for positioning a saddle according to the preferred embodiment of the present invention.

Referring to FIG. 1, there is shown a saddle-positioning apparatus 10 for positioning a saddle 11 according to the preferred embodiment of the present invention. The saddle-positioning apparatus 10 includes a lever 12, a first positioning unit 20 and a second positioning unit 50. The lever 12 includes a first end, a second end 13 and a toggle 15 extending from a portion between the first and second ends thereof.

Figure 2:
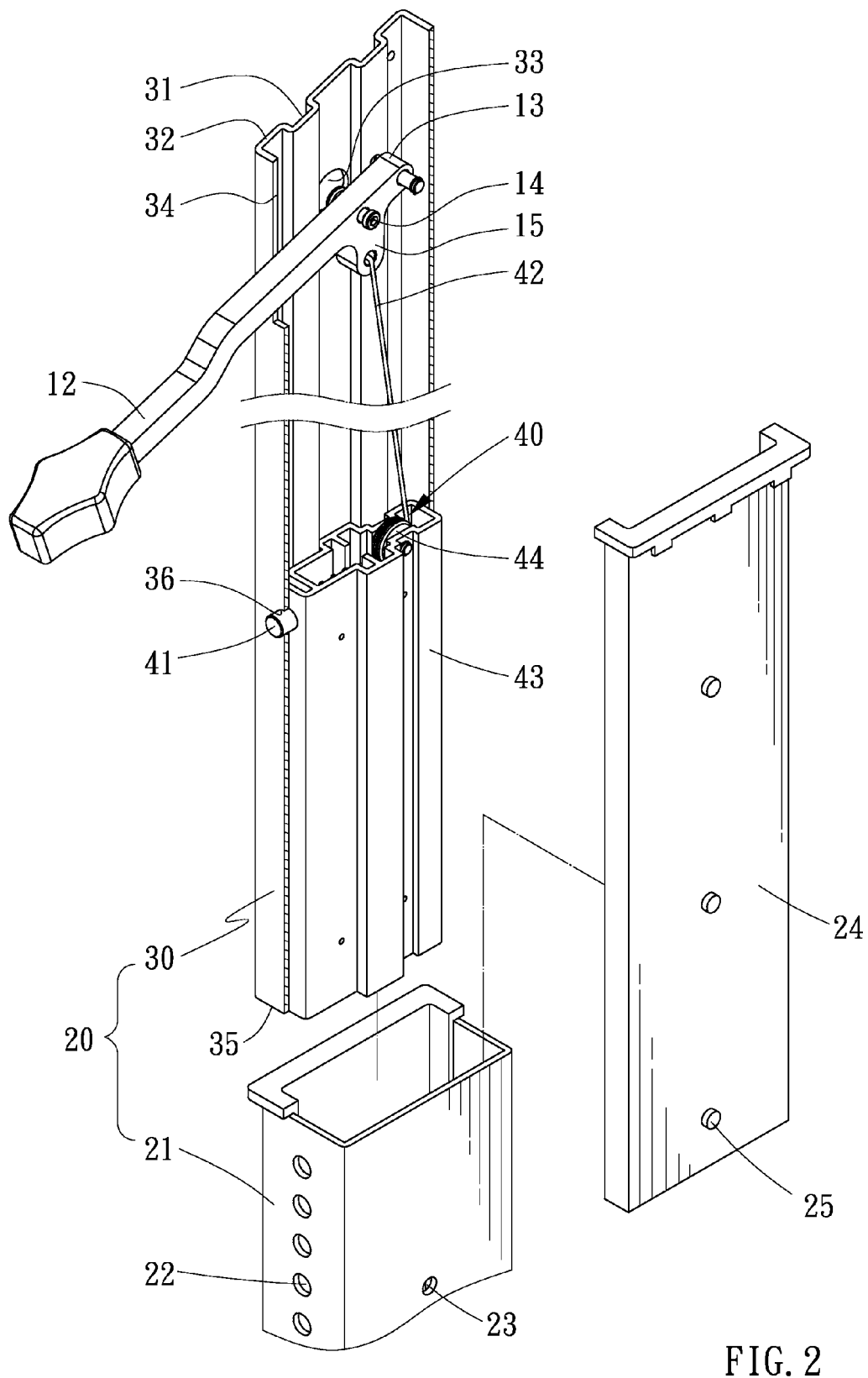
FIG. 2 is an exploded view of a first positioning unit of the apparatus shown in FIG. 1.
Figure 3:
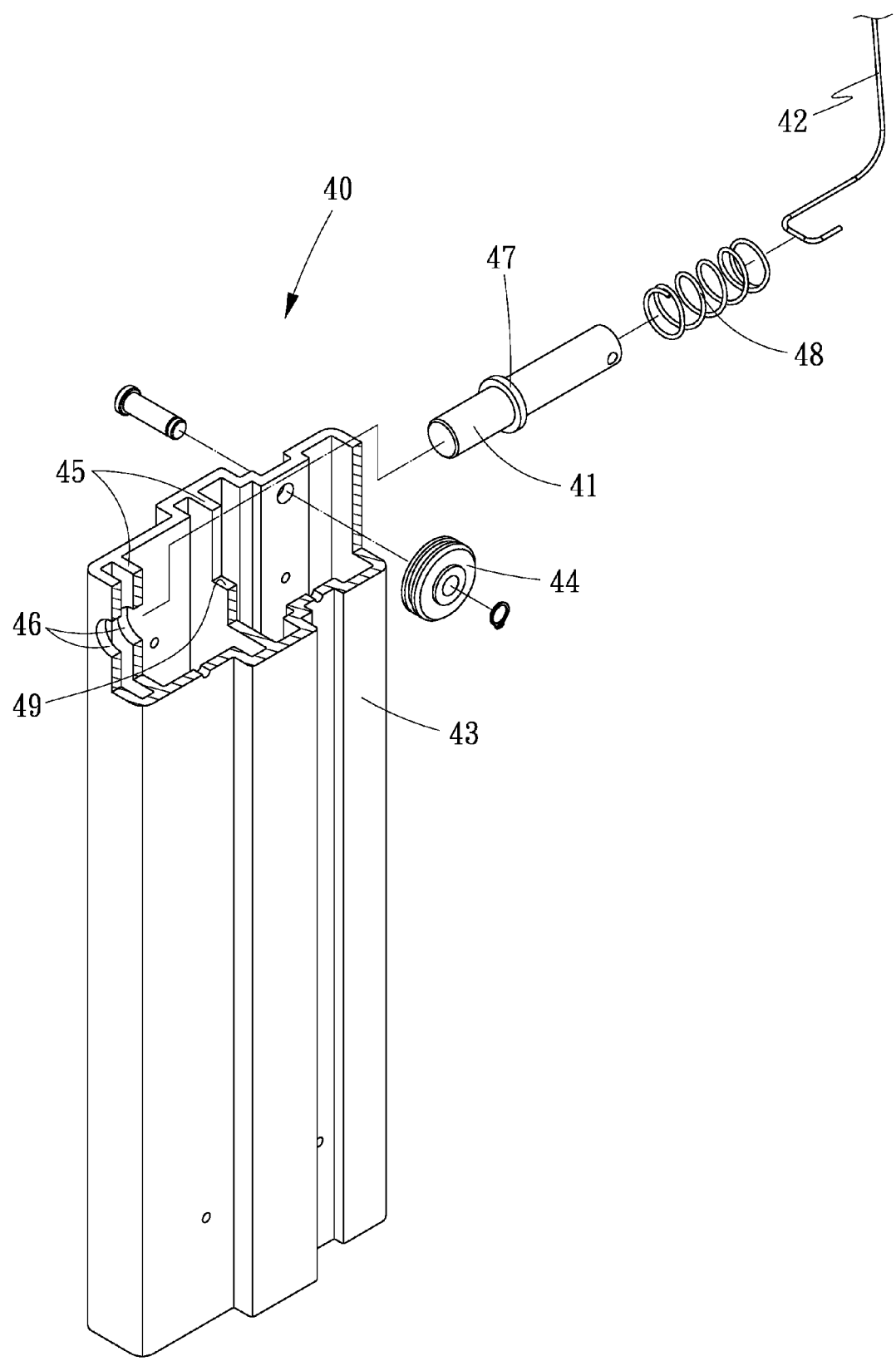
FIG. 3 is an exploded view of the first positioning unit shown in FIG. 2.
Figure 4:
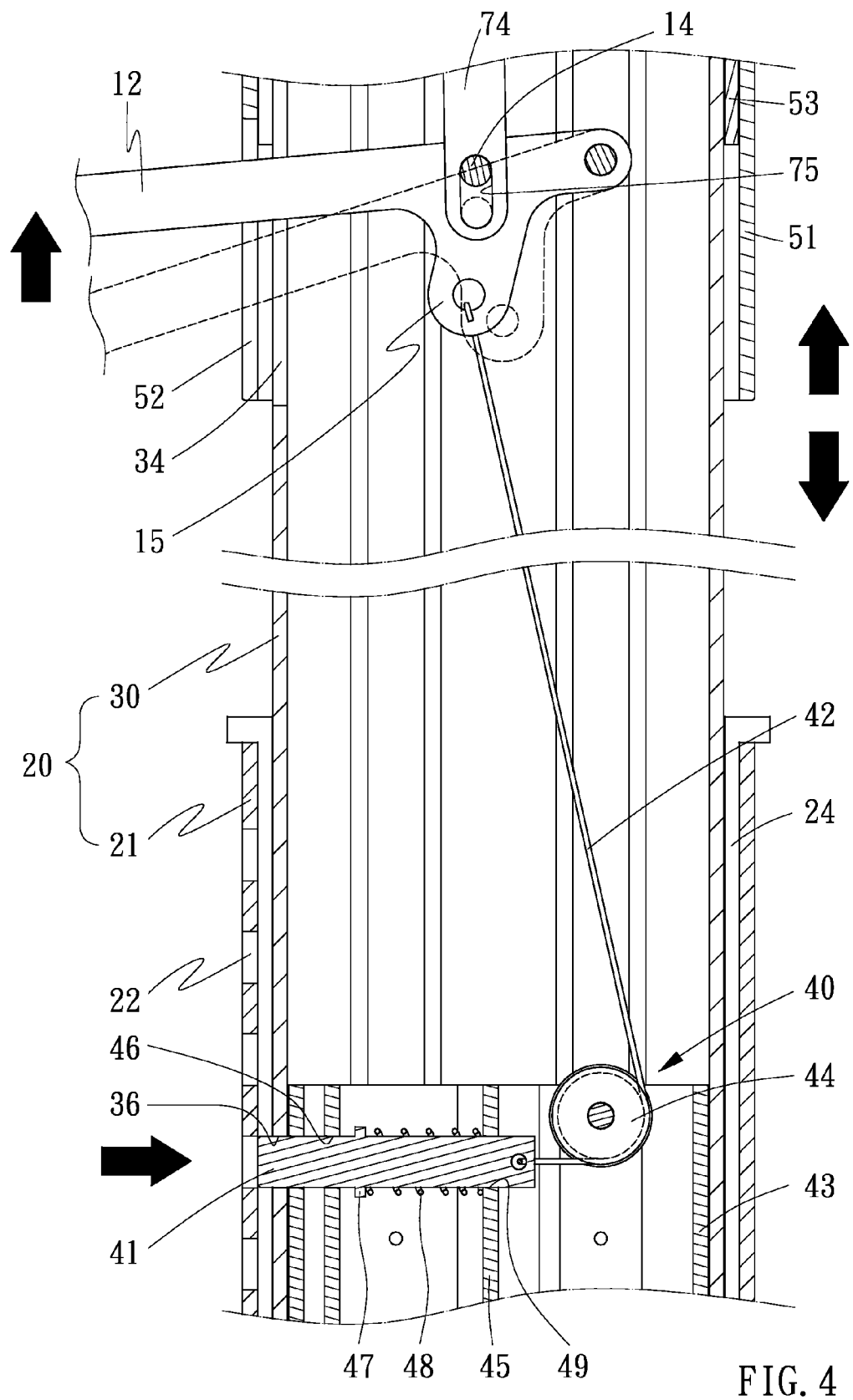
FIG. 4 is a cross-sectional view of the first positioning unit shown in FIG. 3.

Referring to FIGS. 2 through 4, the first positioning unit 20 includes a seat tube 21, a seat post 30, a lining and a first lock 40. The seat tube 21 includes apertures 22 defined therein and arranged along a line extending parallel to the axis thereof and apertures 23 defined therein arranged along another line extending parallel to the axis thereof. The apertures 22 are related to various positions of the seat post 30 and therefore the saddle 11 relative thereto. It is therefore desirable to make many apertures 22 in the seat tube 21.

The lining includes two halves 24 that are made separately and then joined together. Each of the halves 24 of the lining is shaped corresponding to a half of the seat tube 21. Each of the linings 24 of the lining includes bosses 25 formed thereon corresponding to the apertures 23 and a flange formed at an upper end thereof.

The seat post 30 is a tubular element. The seat post 30 is shaped corresponding to the lining. The seat post 30 includes an upper end 32, a lower end 35, four ribs 31 extending from the upper end 32 to the lower end 35, an aperture 33 defined in a lateral portion thereof, a slot 34 defined in a front portion thereof, and an aperture 36 defined in the front portion thereof and located below the slot 34. The axes of the ribs 31 extend parallel to the axis of the seat post 30. The ribs 31 reinforce the seat post 30. The axis of the slot 34 extends parallel to the axis of the seat post 30.

The first lock 40 includes a rod 41, a flexible connector 42, a frame 43, a pulley 44 and a spring 48. The frame 43 is a tubular element. The frame 43 includes two partitions 45 for dividing the exterior thereof into three chambers. The first chamber is defined between a front wall of the frame 43 and the first partition 45, the second chamber is defined between the first and second partitions 45, and the third chamber is defined between the second partition 45 and a rear wall of the frame 43. An aperture 46 is defined in the front wall of the frame 43. Another aperture 46 is defined in the first partition 45. The apertures 46 are aligned with each other. A cutout 49 is defined in the second partition 45.

The rod 41 includes a ring 47 formed thereon, thus dividing the rod 41 into two sections. The first section of the rod 41 is inserted in the apertures 46, the second section of the rod 41 is inserted in the cutout 49, and the ring 47 is located in the second chamber defined in the frame 43.

The spring 48 is a helical spring. The spring 48 is located around the second section of the rod 41. The spring 48 is compressed between the ring 47 and the second partition 45.

The pulley 44 is located in the third chamber defined in the frame 43. The pulley 44 is supported on an axle including two ends each inserted in an aperture defined in a lateral wall of the frame 43.

The flexible connector 42 is a thin metal rod. The flexible connector 42 includes two hooked ends that are adequately rigid and a middle section that is adequately flexible.

In assembly, the first end of the lever 12 is located outside the seat post 30 while the second end 13 of the lever 12 is inserted in the seat post 30 and pivotally connected to the seat post 30 by a pin. Another pin 14 is inserted in the lever 12 through the aperture 33.

The frame 43 is securely inserted in the seat post 30. The first section of the rod 41 is inserted through the apertures 36 and 46 as the rod 41 is loaded with the spring 48, which is compressed between the ring 47 and the second partition 45.

The first hooked end of the flexible connector 42 is inserted and retained in an aperture defined in the second section of the rod 41 since the first hooked end of the flexible connector 42 is adequately rigid. The second hooked end of the flexible connector 42 is inserted and retained in an aperture defined in the toggle 15 because the second hooked end of the flexible connector 42 is adequately rigid. The middle section of the flexible connector 42 is wound around the pulley 44 because the middle section of the flexible connector 42 is adequately flexible.

The lining is inserted in the seat tube 21. The bosses 25 are inserted in the apertures 23, thus positioning the lining relative to the seat tube 21. The flanges of the halves 24 of the lining are located against an upper end of the seat tube 21.

The lower end 35 of the seat post 30 is movably inserted in the lining securely inserted in the seat tube 21. The lining is located between the lower end 35 of the seat post 30 and the seat tube 21 to ensure smooth movement of the lower end 35 of the seat post 30 in the seat tube 21.

Normally, the first section of the rod 41 is inserted in a selected one of the apertures 22 through the apertures 36 and 46 because the rod 41 is biased by the spring 48, which is compressed between the ring 47 and the second partition 45. Thus, the saddle 11 is kept in a selected one of various positions relative to the seat tube 21 in a first dimension.

As indicated by a solid line in FIG. 4, the lever 12 is lifted. The flexible connector 42 is pulled by the lever 12. The rod 41 is moved by the flexible connector 42. The spring 48 is further compressed. The first section of the rod 41 is withdrawn in the seat tube 21, i.e., removed from the apertures 22. Therefore, the seat post 30 is movable relative to the seat tube 21.

Then, the lever 12 is released. The first section of the rod 41 is inserted in another one of the apertures 22 by the spring 48. That is, the saddle 11 is kept in another one of the positions relative to the seat tube 21.

Figure 5:
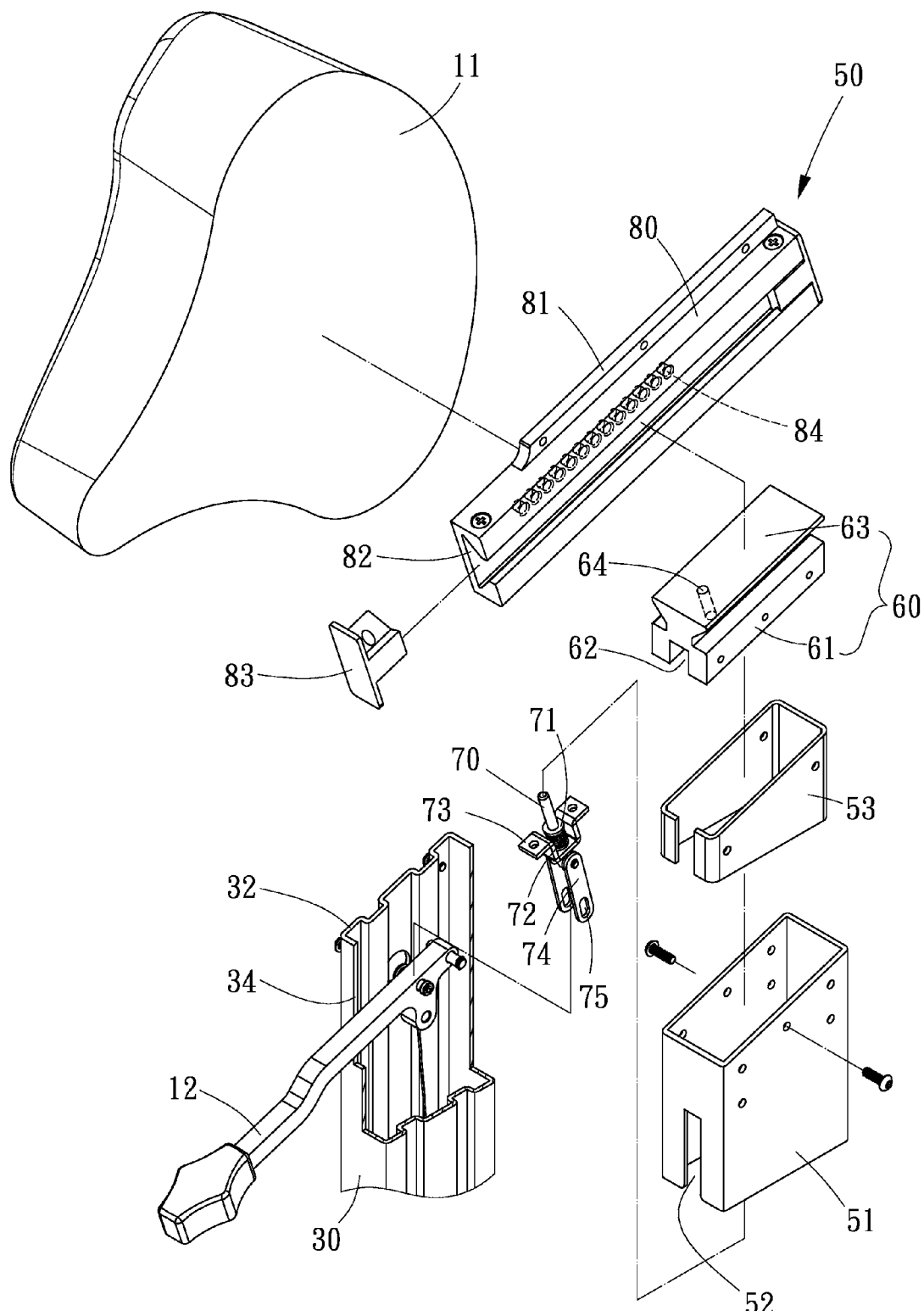
FIG. 5 is an exploded view of a second positioning unit of the apparatus shown in FIG. 1.
Figure 6:
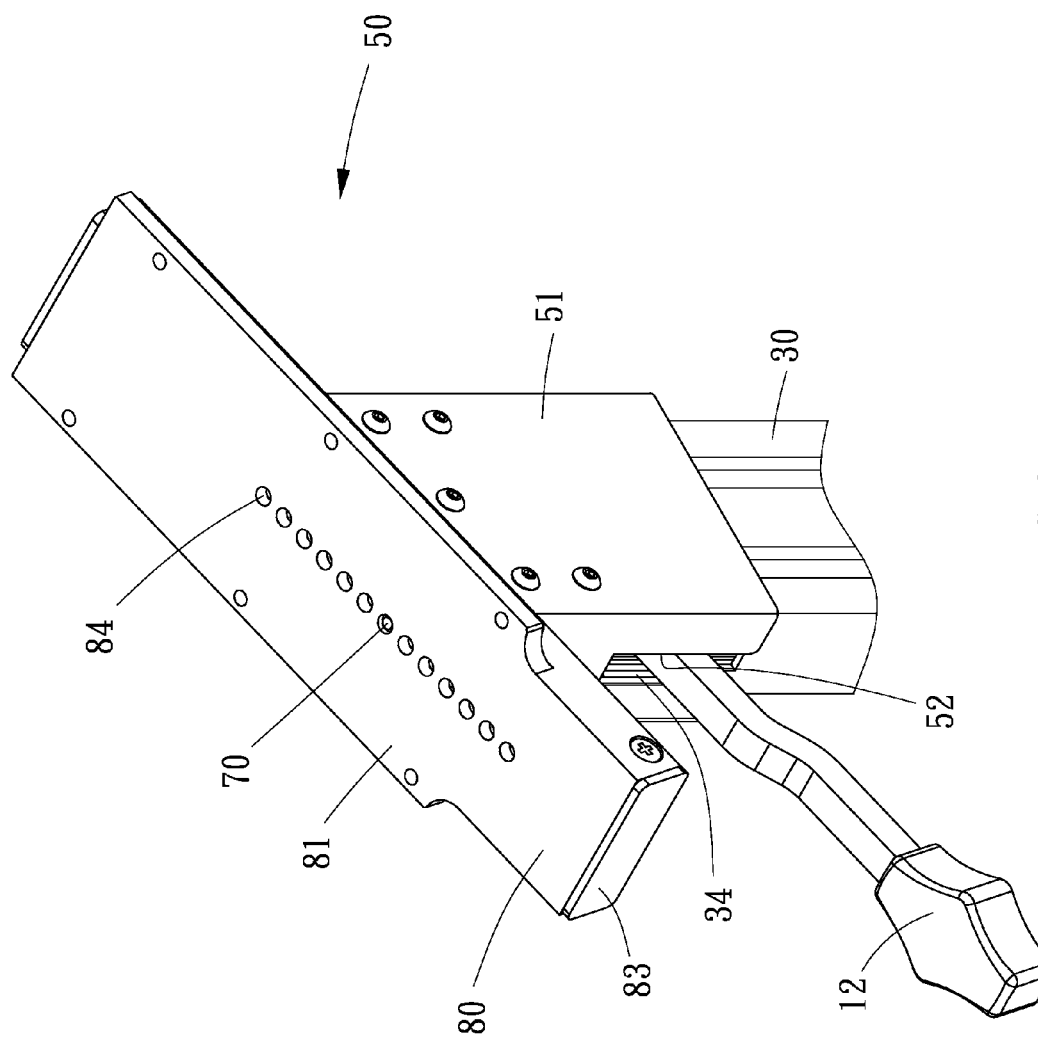
FIG. 6 is a perspective view of the second positioning unit of FIG. 5.
Figure 7:
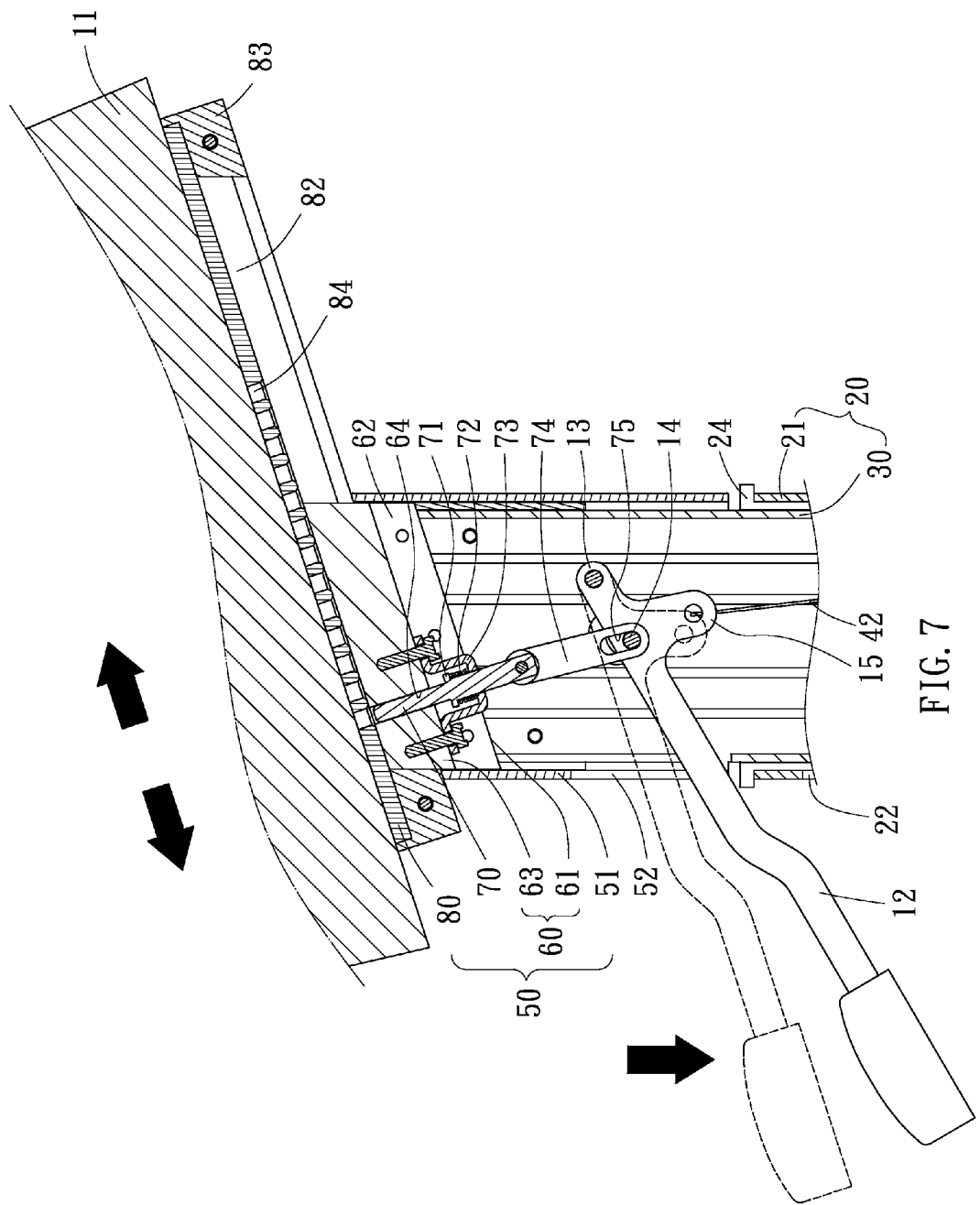
FIG. 7 is a cross-sectional view of the second positioning unit shown in FIG. 6.

Referring to FIGS. 5 through 7, the second positioning unit 50 includes a sleeve 51, a supporting element 53, a platform 60, a sliding element 80 and a second lock. The sleeve 51 is shaped corresponding to the seat post 30. The sleeve 51 includes a slit 52 defined in a front wall thereof. The supporting element 53 is shaped corresponding to the sleeve 51.

The platform 60 includes a lower portion 61 formed with a groove 62 and an upper portion formed as a dovetail track 63. The axis of the groove 62 extends parallel to the axis of the dovetail track 63. A tunnel 64 is defined in the dovetail track 63. The tunnel 64 is in communication with the groove 62.

The sliding element 80 includes two wings 81 extending on two opposite sides thereof, a dovetail groove 82 defined in another side thereof, and apertures 84 defined therein. The axis of the dovetail groove 82 extends parallel to the axis of the sliding element 80. The apertures 84 are arranged along a line extending parallel to the axis of the sliding element 80. The dovetail groove 82 is made corresponding to the dovetail track 63. The apertures 84 are in communication with the dovetail groove 82.

There is provided a plug 83. The plug 83 includes a flat portion and a dovetail portion extending from a side of the flat portion. The dovetail portion of the plug 83 is shaped corresponding to the dovetail groove 82.

The second lock includes a rod 70, a spring 72, a frame 73 and two connectors 74. The rod 70 includes a ring 71 formed thereon, thus dividing the rod 70 into two sections. The frame 73 includes a middle section, two vertical sections perpendicularly extending from the middle section, and two lateral sections each perpendicularly extending from a related one of the vertical sections. The spring 72 is a helical spring. Each of the connectors 74 includes a slot 75 defined therein.

In assembly, the sleeve 51 is located around and securely connected to the seat post 30. The slit 52 is aligned with the slot 34. The supporting element 53 is located in and secured to the sleeve 51.

The first section of the rod 70 is inserted through the tunnel 64. The spring 72 is located around the second section of the rod 70 that is inserted through an aperture defined in the middle section of the frame 73. The lateral sections of the frame 73 are secured to the lower portion 61 of the platform 60 so that the spring 72 is compressed between the ring 71 and the middle section of the frame 73. The connectors 74 are pivotally connected to the second section of the rod 70 by a pin. The pin 14 includes two ends each inserted through the slot 75 defined in a related one of the connectors 74.

The lower portion 61 of the platform 60 is located in and secured to the sleeve 51. The lower section 61 of the platform 60 is supported on the supporting element 53. The dovetail track 63 is movably located in the dovetail groove 82. The dovetail portion of the plug 83 is inserted in the dovetail groove 82 so that the dovetail groove 82 is blocked by the flat portion of the plug 83. Thus, the sliding element 80 is kept on the platform 60. The saddle 11 is secured to the sliding element 80. The wings 81 are secured to the saddle 11.

Normally, the first section of the rod 70 is inserted in a selected one of the apertures 84 through the tunnel 64 since the rod 70 is biased by the spring 72, which is compressed between the ring 71 and the middle section of the frame 73. Thus, the saddle 11 is kept in a selected one of various positions relative to the seat post 30 in a second dimension different from the first dimension.

As indicated by a solid line in FIG. 7, the lever 12 is lowered. The connectors 74 are pulled by the lever 12. The rod 70 is lowered by the connectors 74. The spring 72 is further compressed. The first section of the rod 70 is withdrawn in the tunnel 64, i.e., removed from the apertures 84. Therefore, the sliding element 80 is movable relative to the seat platform 60, i.e., the saddle 11 is movable relative to the seat post 30 in the second dimension.

Then, the lever 12 is released. The first section of the rod 70 is inserted in another one of the apertures 84 by the spring 72. That is, the saddle 11 is kept in another one of the positions relative to the seat post 30 in the second dimension.

Figure 8:
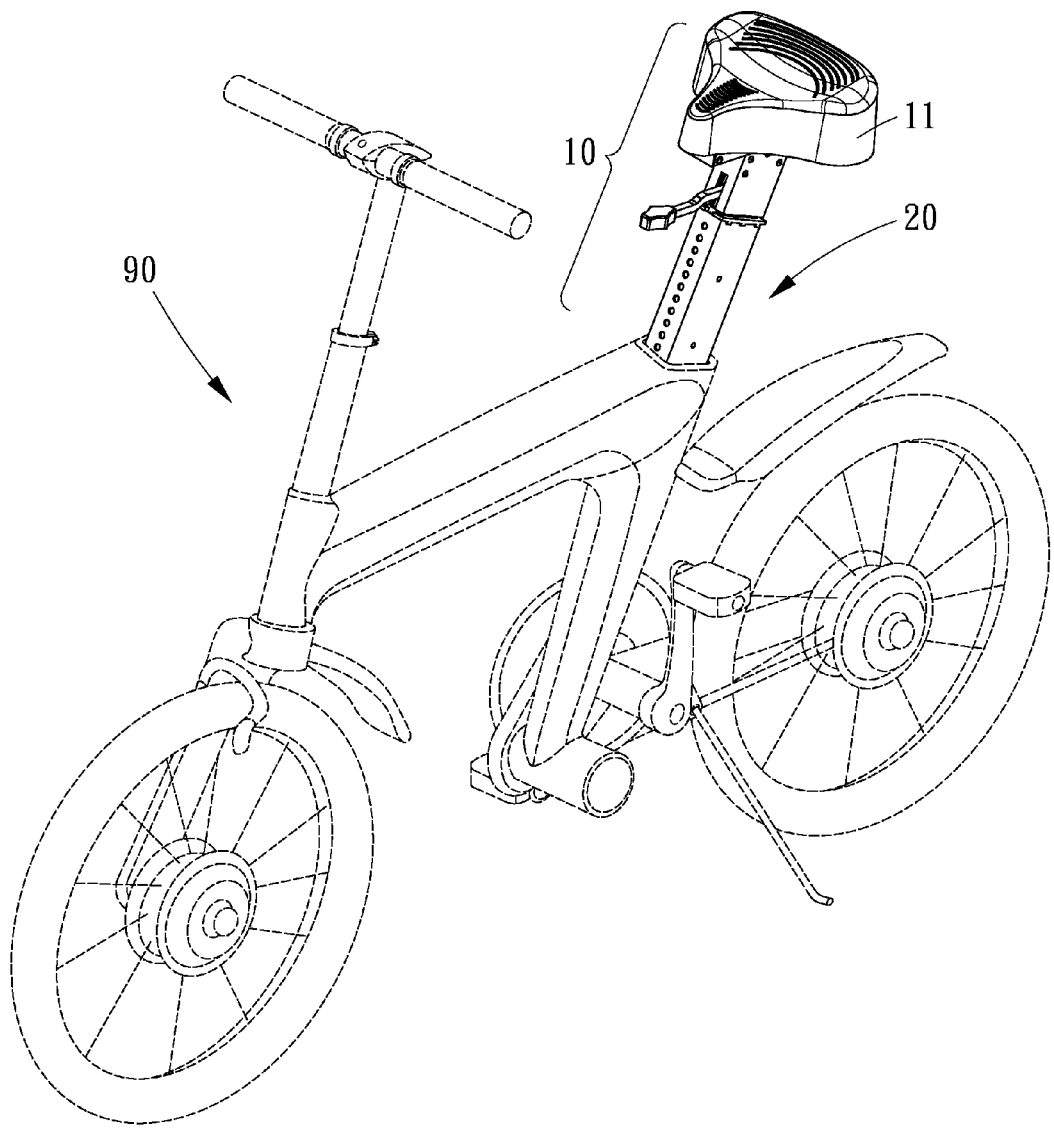
FIG. 8 is a perspective view of a bicycle equipped with the apparatus shown in FIG. 1.

Referring to FIG. 8, the saddle-positioning apparatus 10 is used to position the saddle 11 relative to a bicycle 90.

Figure 9:
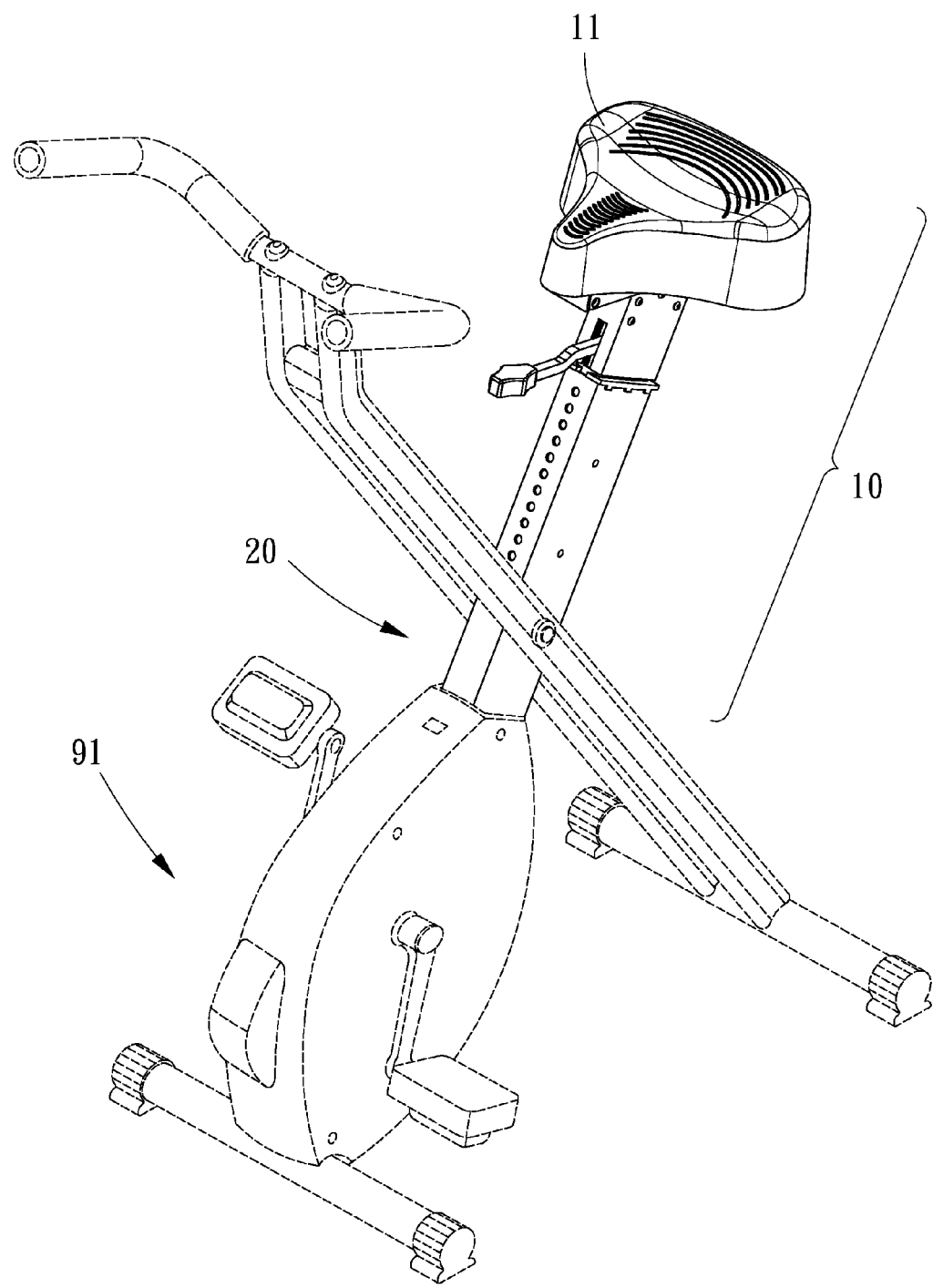
FIG. 9 is a perspective view of an exercise bike equipped with the apparatus shown in FIG. 1.

Referring to FIG. 9, the saddle-positioning apparatus 10 is used to position the saddle 11 relative to an exercise bike 91.

As discussed above, the position of the saddle 11 in the first dimension is adjustable based on the length of a user's legs because of the first positioning unit 20. The position of the saddle 11 in the second dimension is adjustable based on the length of the user's torso or arms because of the second positioning unit 50.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A saddle-positioning apparatus including:
   a first positioning unit for positioning a saddle in a first dimension;
   a second positioning unit for positioning the saddle in a second dimension; and
   a lever connected to both of the first and second positioning units, wherein the lever is movable from a neutral position in a direction to move the first positioning unit from a locking position to a releasing position to allow movement of the saddle in the first dimension, wherein the lever is movable from the neutral position in an opposite direction to move the second positioning unit from a locking position to a releasing position to allow movement of the saddle in the second dimension.

2. The saddle-positioning apparatus according to claim 1, wherein the first positioning unit includes:
   a seat tube;
   a seat post telescopically inserted in the seat tube and connected to the second positioning unit; and
   a first lock connected to the lever and operable to lock the seat post to the seat tube.

3. The saddle-positioning apparatus according to claim 2, wherein the seat tube includes a plurality of apertures defined therein, wherein the seat post includes an aperture defined therein, wherein the first lock includes a rod for insertion in a selected one of the apertures of the seat tube through the aperture of the seat post.

4. The saddle-positioning apparatus according to claim 3, wherein the first lock includes a frame inserted in and secured to the seat post, wherein the rod is movably inserted in the frame.

5. The saddle-positioning apparatus according to claim 4, wherein the first lock includes a spring compressed between a portion of the rod and a portion of the frame.

6. The saddle-positioning apparatus according to claim 5, wherein the rod includes a ring formed thereon, wherein the frame includes a partition formed on an internal side thereof, wherein the spring is compressed between the ring and the partition.

7. The saddle-positioning apparatus according to claim 3, wherein the first lock includes a flexible connector for connecting the rod to the lever.

8. The saddle-positioning apparatus according to claim 7, wherein the first lock includes a pulley secured to the seat post, wherein the flexible connector is wound around the pulley.

9. The saddle-positioning apparatus according to claim 2, wherein the first positioning unit includes a lining located between the seat tube and the seat post to ensure smooth movement of the seat post in the seat tube.

10. The saddle-positioning apparatus according to claim 9, wherein the lining includes two halves made separately and then joined together.

11. The saddle-positioning apparatus according to claim 10, wherein each of the halves of the lining includes at least one boss formed thereon, wherein the seat tube includes at least one aperture defined therein for receiving the boss.

12. The saddle-positioning apparatus according to claim 2, wherein the second positioning unit includes:
    a platform secured to the seat post;
    a sliding element movably supported on the platform and connected to the saddle; and
    a second lock connected to the lever and operable for locking the sliding element to the platform.

13. The saddle-positioning apparatus according to claim 12, wherein the platform includes a dovetail track formed thereon, wherein the sliding element includes a dovetail groove defined therein for receiving the dovetail track.

14. The saddle-positioning apparatus according to claim 12, wherein the sliding element includes a plurality of apertures defined therein, wherein the platform includes a tunnel defined therein, wherein the second lock includes a rod for insertion in a selected one of the apertures of the sliding element via the tunnel of the platform.

15. The saddle-positioning apparatus according to claim 14, wherein the second lock includes a frame secured to the platform, wherein the rod is movably inserted in the frame.

16. The saddle-positioning apparatus according to claim 15, wherein the second lock includes a spring compressed between a portion of the rod and a portion of the frame.

17. The saddle-positioning apparatus according to claim 16, wherein the rod includes a ring formed thereon, wherein the frame includes two lateral sections secured to the platform and a middle section extending between the lateral sections, wherein the spring is compressed between the ring and the middle section of the frame.

18. The saddle-positioning apparatus according to claim 14, wherein the second lock includes at least one connector for connecting the rod to the lever.

19. The saddle-positioning apparatus according to claim 18, wherein the connector includes a slot defined therein, wherein the second lock includes a pin inserted in the slot through an aperture defined in the lever.

20. The saddle-positioning apparatus according to claim 19, wherein the seat post includes an aperture through which the pin is inserted in the seat post.

* * * * *